April 28, 1970     G. M. HIPPLE     3,509,300
PUSHBUTTON MEANS WITH PULLOUT PUSHIN RELEASE
Filed Jan. 25, 1968     7 Sheets-Sheet 1
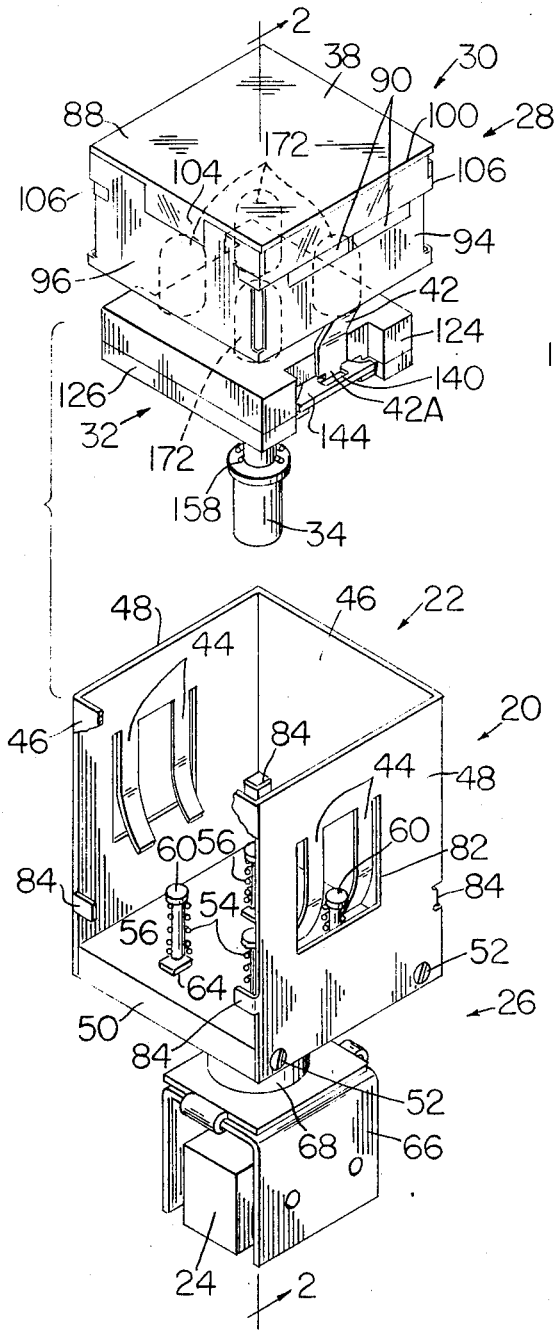
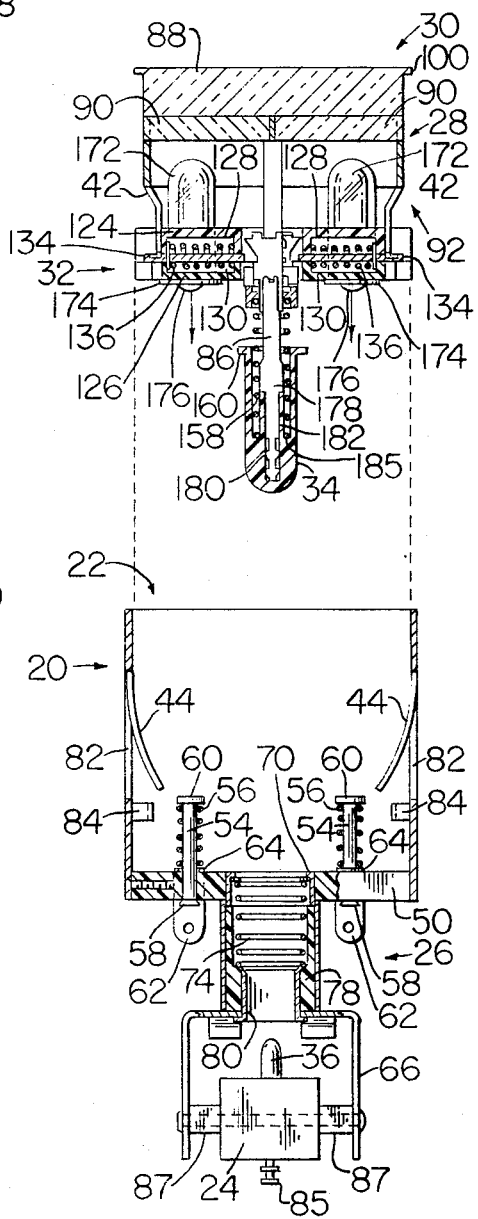
INVENTOR.
GEORGE M. HIPPLE
BY
Cander & Cander
HIS ATTORNEYS

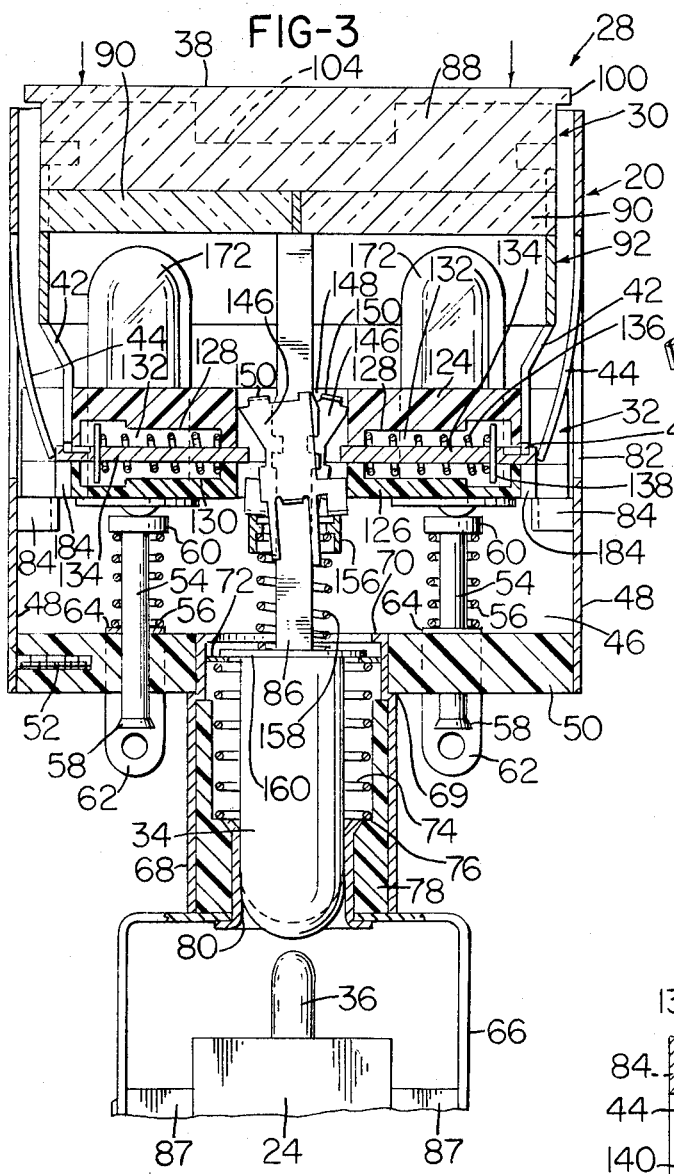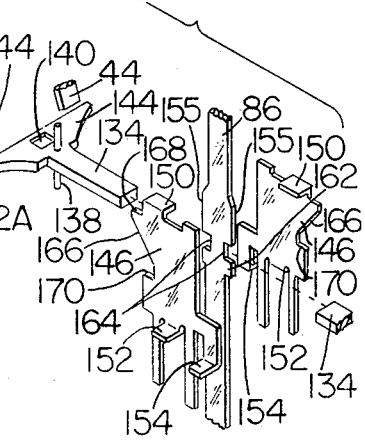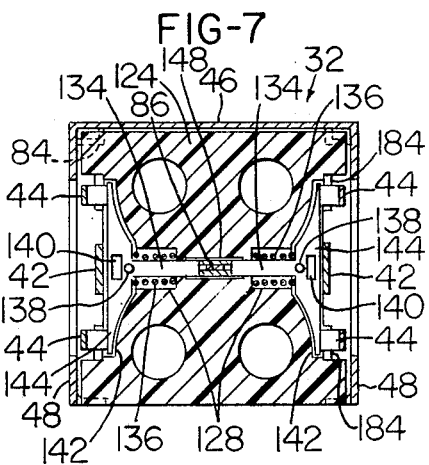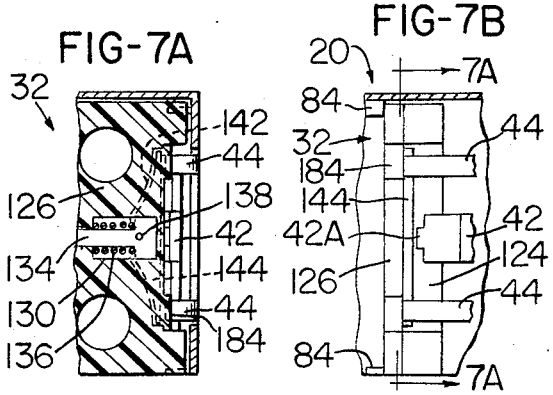

April 28, 1970   G. M. HIPPLE   3,509,300
PUSHBUTTON MEANS WITH PULLOUT PUSHIN RELEASE
Filed Jan. 25, 1968   7 Sheets-Sheet 3
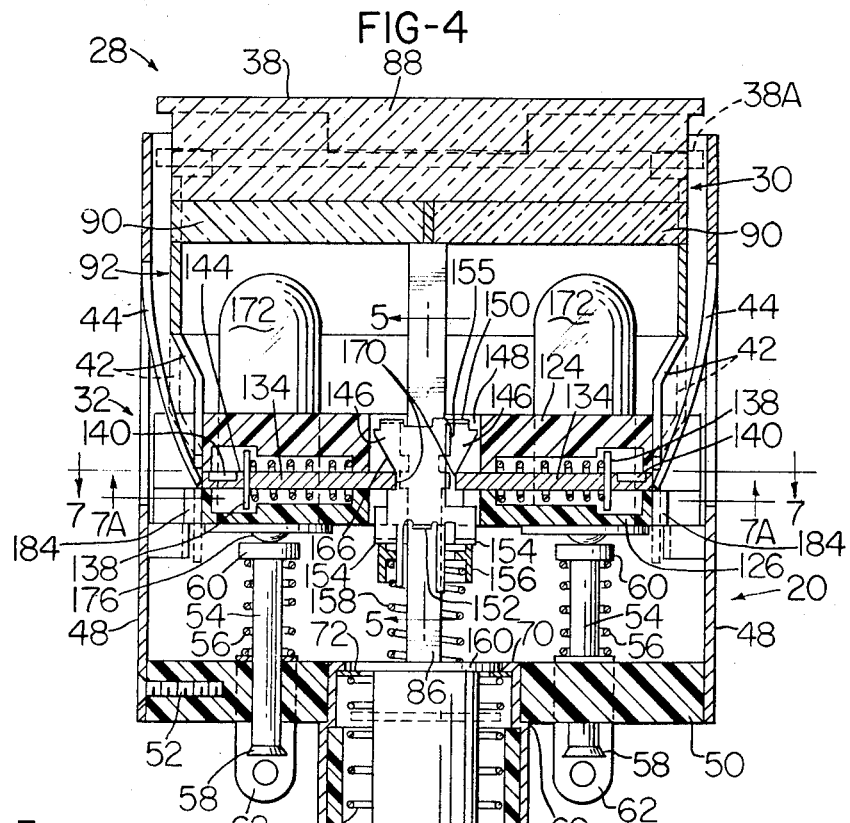
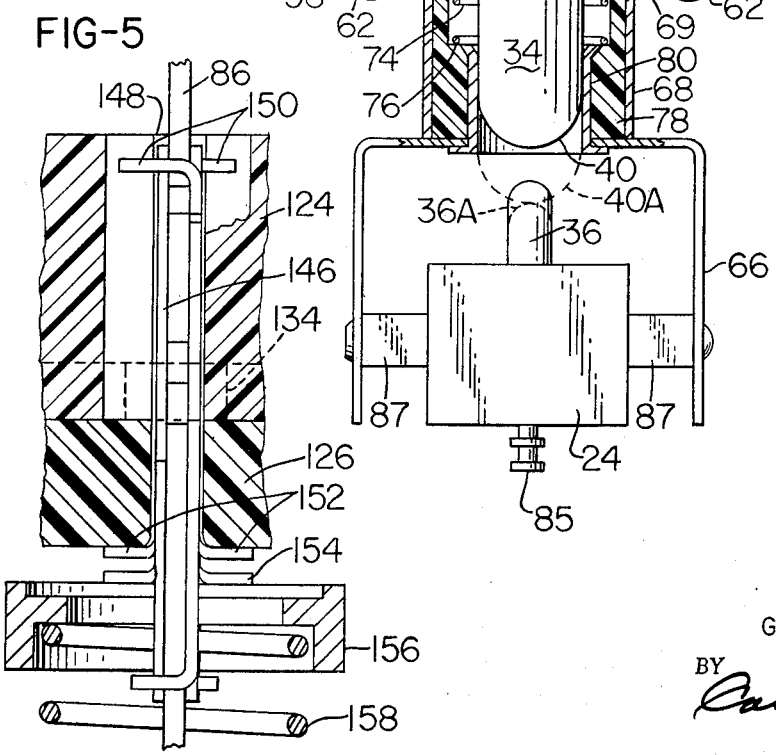
INVENTOR.
GEORGE M. HIPPLE
BY
Candor & Candor
HIS ATTORNEYS

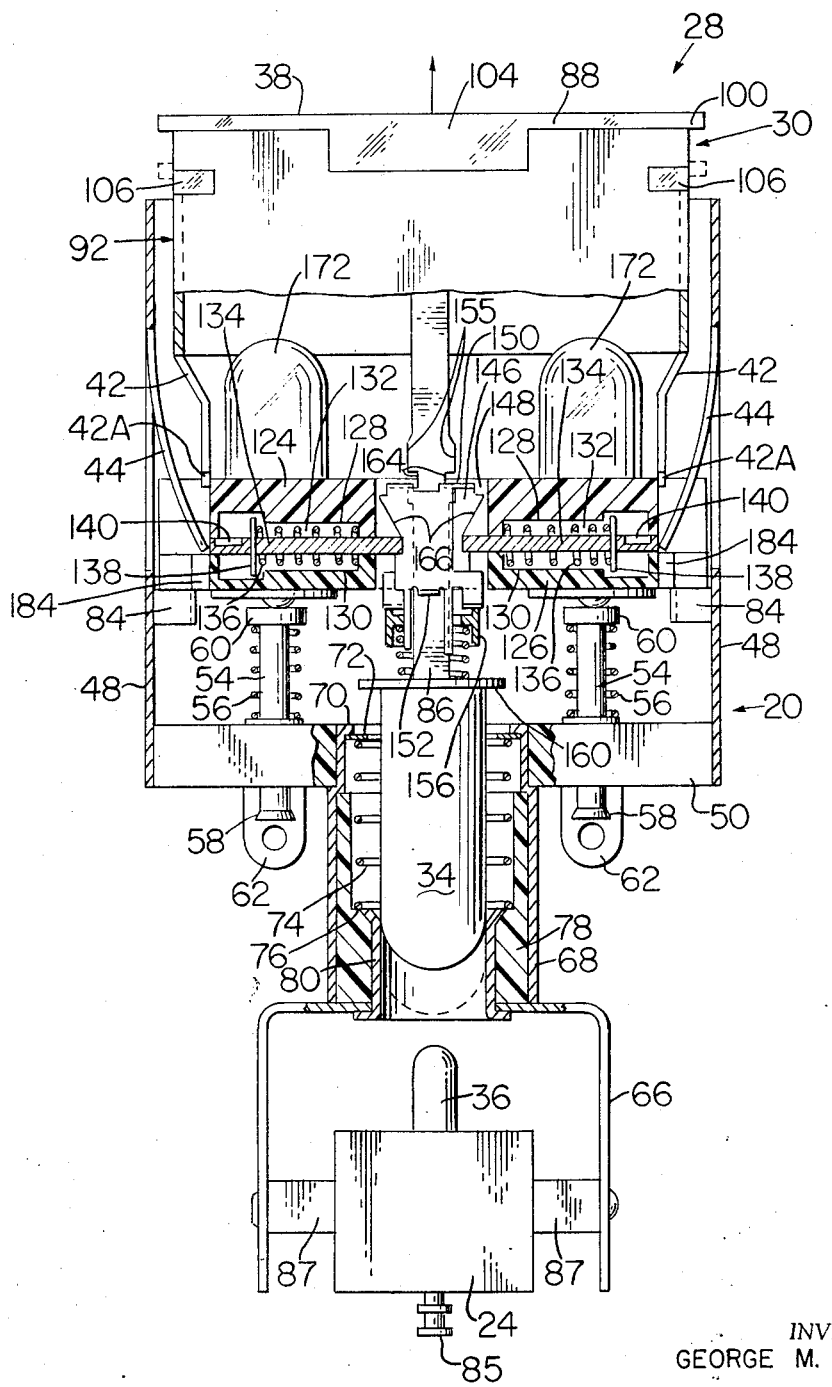

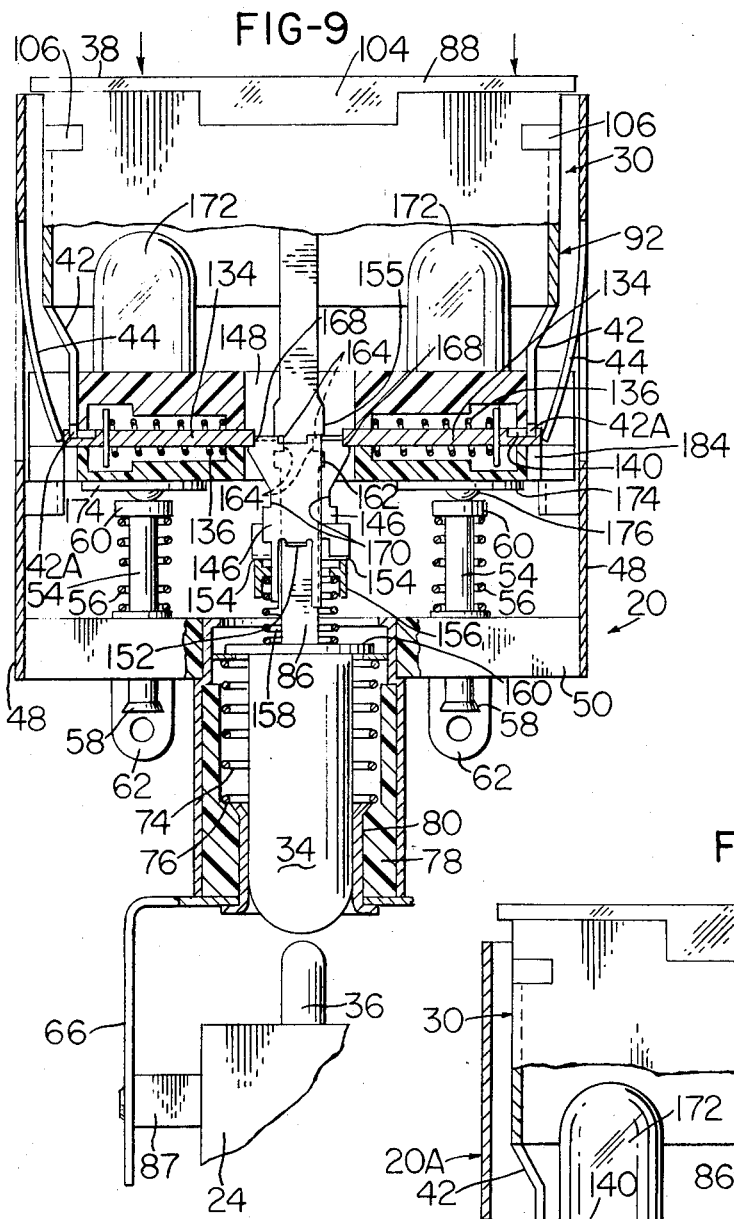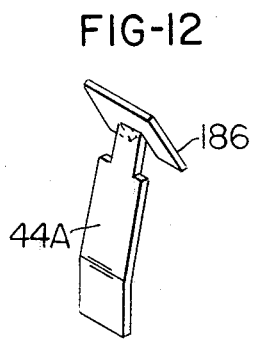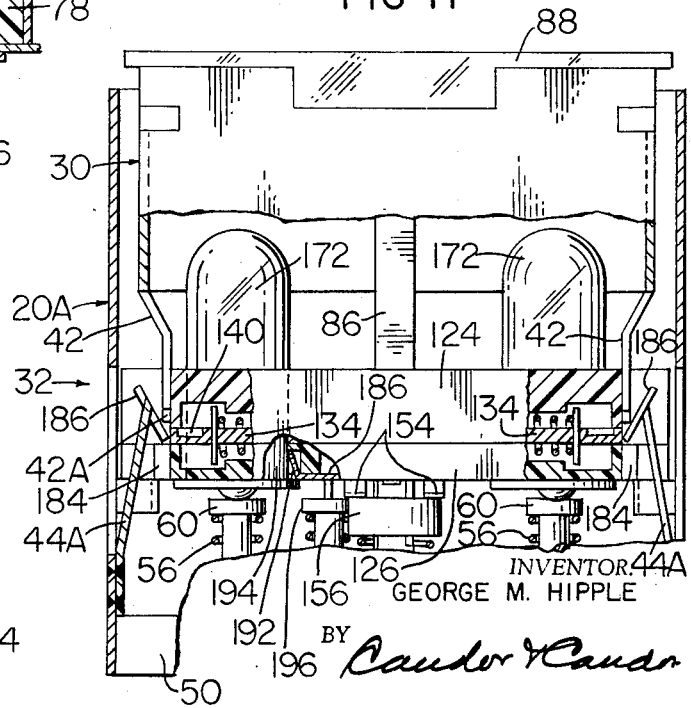

April 28, 1970 G. M. HIPPLE 3,509,300
PUSHBUTTON MEANS WITH PULLOUT PUSHIN RELEASE
Filed Jan. 25, 1968 7 Sheets-Sheet 6
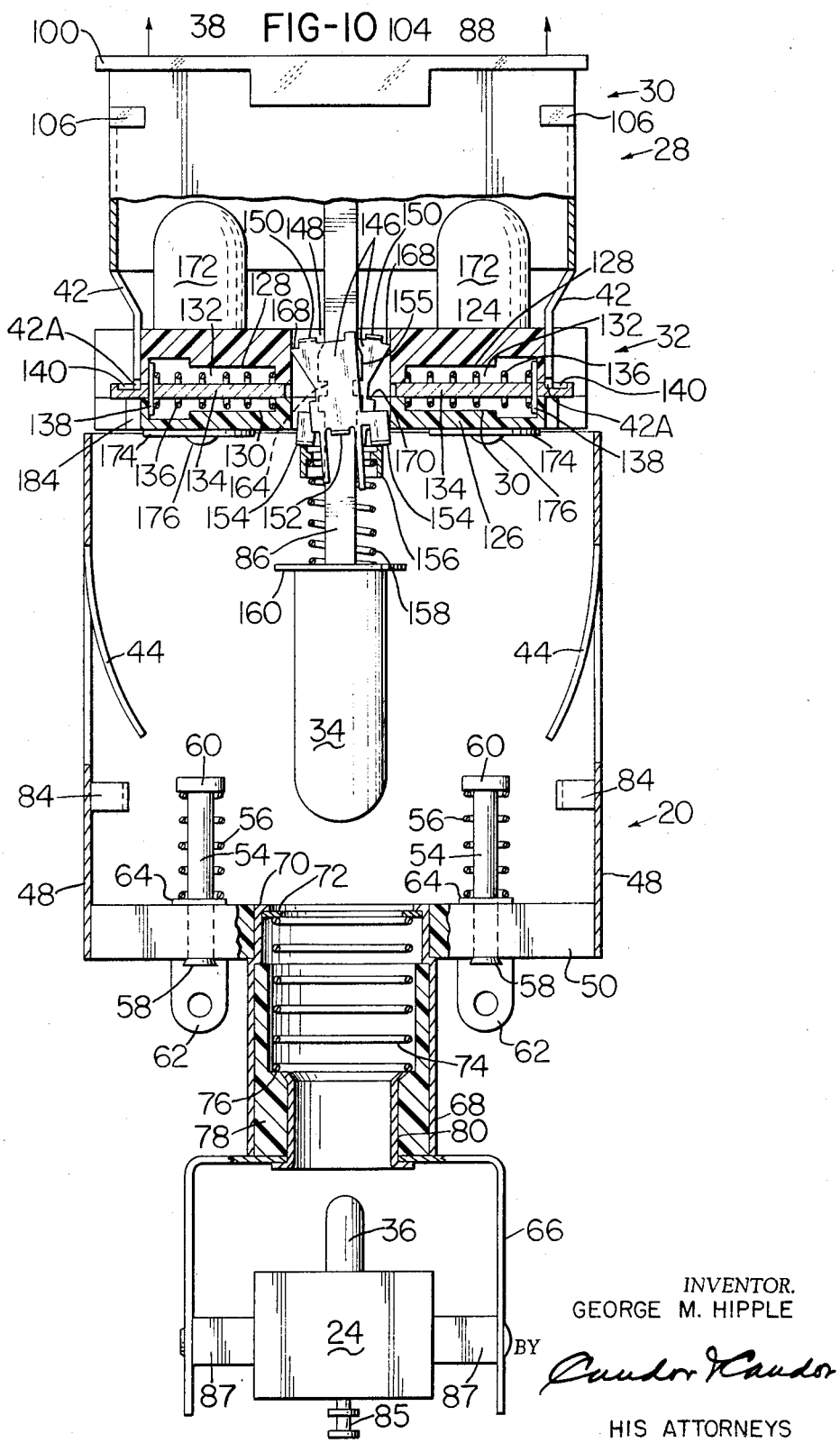
INVENTOR.
GEORGE M. HIPPLE
BY
Caudor & Caudor
HIS ATTORNEYS April 28, 1970   G. M. HIPPLE   3,509,300
PUSHBUTTON MEANS WITH PULLOUT PUSHIN RELEASE
Filed Jan. 25, 1968   7 Sheets-Sheet 7
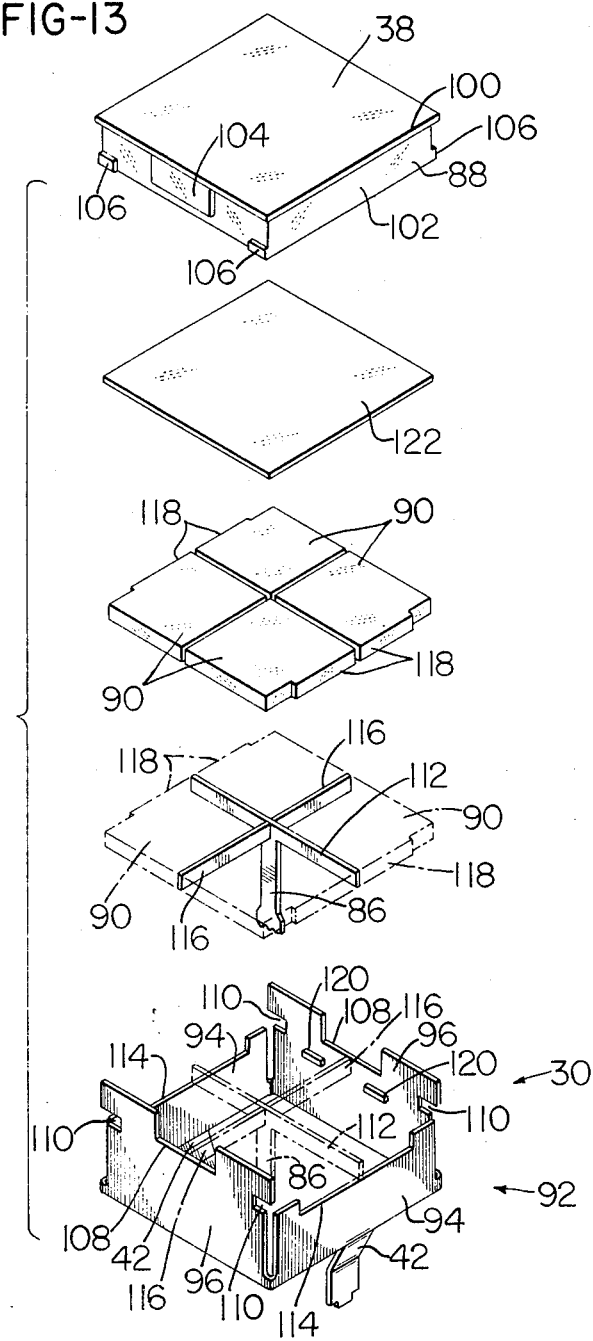
INVENTOR.
GEORGE M. HIPPLE
BY *Candr V Cavdn*
HIS ATTORNEYS

United States Patent Office 3,509,300
Patented Apr. 28, 1970

3,509,300
PUSHBUTTON MEANS WITH PULLOUT PUSHIN RELEASE
George M. Hipple, Columbus, Ohio, assignor to Robertshaw Controls Company, Richmond, Va., a corporation of Delaware
Filed Jan. 25, 1968, Ser. No. 700,628
Int. Cl. H01h 9/18
U.S. Cl. 200—167                                    18 Claims

ABSTRACT OF THE DISCLOSURE

An illuminated pushbutton switch construction has a pushbutton initially movable inward into a casing which is then released. The pushbutton is automatically locked in the casing during these actions. During this initial pushing in action, the pushbutton cannot actuate the switch that is connected with the casing. The pushbutton can be released from the casing by an initial pulling out action followed by a pushing in action and a release after such last-named pushing in action.

---

This invention relates to pushbutton means with pull out push in releases.

One of the features of this invention includes a pushbutton means initially movable inward into a switch casing by an initial pushing in action, which automatically locks the pushbutton means in the casing.

Another feature of this invention includes a release means for removing the pushbutton means from the casing after the pushbutton means has been automatically locked in the casing. Such release means may include an initial pulling out action followed by a pushing in action.

Another feature of this invention includes a safety means whereby the pushbutton cannot actuate a switch means that is connected with the casing during the initial pushing in action, and can only actuate the switch means after the pushbutton has been released following such initial pushing in action.

Other features of this invention are apparent from this description, the accompanying claimed subject matter, and/or the accompanying drawings, in which:

FIGURE 1 is an exploded, perspective view of an embodiment of this invention.

FIGURE 2 is an exploded cross section along the line 2—2 of FIGURE 1.

FIGURE 3 is an enlarged cross section showing the pushbutton means, including a lens assembly and a lamp base assembly in an initial pushed in condition, and prevented from actuating the switch means.

FIGURE 4 is a view similar to FIGURE 3 and showing said pushbutton means moved slightly upwardly from the position of FIGURE 3 and ready to be repeatedly pushed in and released for actuation and unactuation of the switch means.

FIGURE 5 is a partial enlarged cross section of FIGURE 4 taken along the line 5—5 of FIGURE 4.

FIGURE 6 is an exploded perspective view of certain parts of the pushbutton means.

FIGURE 7 is a reduced scale cross section taken along the line 7—7 of FIGURE 4, showing the upper lamp holder plate in cross section.

FIGURE 7A is a cross section of the lower lamp base plate, looking upwardly and taken just below its upper surface, and along the line 7A—7A of FIGURE 4.

FIGURE 7B is an end view of the upper and lower lamp base plates which are shown in FIGURES 7 and 7A.

FIGURE 8 is a view similar to FIGURE 4, and showing the pushbutton means initially pulled outwardly and upwardly as a first step in removing the pushbutton means from the casing.

FIGURE 9 is a view similar to FIGURE 8 and showing the pushbutton means pushed down and inwardly as a second step in removing the pushbutton means from the casing.

FIGURE 10 is a view similar to FIGURE 9 and showing a subsequent step in removing the pushbutton means from the casing.

FIGURE 11 is a view similar to part of FIGURE 4 with modified casing locking fingers.

FIGURE 12 is a perspective view of one of the casing locking fingers of FIGURE 11.

FIGURE 13 is an exploded, perspective view of the lens assembly.

FIGURE 14 is a diagrammatic upward view of the lower lamp base plate.

Certain words may be used in this specification and the claimed subject matter indicating direction, relative position, and the like. Such words are used for the sake of brevity and clearness. It is to be understood, however, that such words are used only in connection with the views of the drawings, and that in actual use, any parts or movements described by such words may have entirely different direction, relative position, and the like. Examples of such words are "vertical," "horizontal," "upper," "lower," and the like.

BRIEF PRELIMINARY DESCRIPTION

This invention may include a casing 20, which has a pushbutton construction means receiving casing aperture means or end 22. A switch means 24 may be connected to the casing 20 such as to the switch means receiving end means 26.

A pushbutton means or pushbutton construction means 28 to operate the switch means 26 is movable inward relatively to the casing 20 by an initial pushing in action, as shown in FIGURE 3.

The pushbutton means 28 may include a pushing in member means lens assembly 30 and a lamp holder means or lamp base assembly 32.

A safety means, to be more fully described, is provided to prevent the pushbutton means 28 from operating the switch means 26 until after such initial pushing in action has been discontinued. For example, in FIGURE 3, the switch actuating plunger 34 is shown as arrested or stopped at the full line position of FIGURE 3 before it can push down or actuate the switch means actuator or downwardly movable rod 36. The rod 36 may be outwardly or upwardly biased in the unactuated position of FIGURE 3, and may be movable to its actuated position 36A by downward movement of plunger 34.

When the initial pushing in action of FIGURE 3 is discontinued, and the pushbutton means 28 is released by operator, such pushbutton means 28 moves outwardly or upwardly to the position of FIGURE 4 and attains a switch means operable condition. That is, thereafter the pushbutton means 28 may be repeatedly pushed in downwardly and released repeatedly to actuate and unactuate the switch means 26 as often as desired. Likewise the plunger end 40 is repeatedly pushed down to the dotted line position 40A repeatedly to actuate the actuator rod 36 to the lower dotted line position, respectively to actuate and unactuate the switch means 26.

The lens assembly 30, of the push button means 28, is the member that is repeatedly pushed in. The upper surface 38 of the lens assembly 30 is pushed down to the dotted line position 38A, FIGURE 4. This causes several parts likewise to be pushed down to lower dotted line positions more fully to be described. These parts cause the downward and upward movements of the plunger end 40 and switch means actuator 36.

Locking means are provided to lock the pushbutton means 28 in the switch means operable condition of FIGURE 4, in a manner to be more fully described. However, briefly, the lens assembly 30 has upwardly and downwardly movable relatively rigid lens assembly fingers 42, and the casing 20 has laterally inwardly biased flexible casing fingers 44. These fingers 42 and 44 cooperate as shown in FIGURES 3 and 4 to lock the lamp base assembly 32 within the casing 20 in the position shown in FIGURE 4.

Release means are provided to release the pushbutton means 28 from the operable locked condition of FIGURE 4 so that the pushbutton means 28 may be removed outwardly and upwardly from the casing 20, in a manner to be more fully described. Briefly, this may be accomplished by upwardly pulling out the lens assembly 30, FIGURE 8, from its previous position in FIGURE 4, until the lens assembly 30 is stopped by means shown in FIGURE 8, and in a manner to be described. Thereafter, the lens assembly 30 is pushed in from the position of FIGURE 8 to the position of FIGURE 9, until the lens assembly 30 is stopped, as shown in FIGURE 9, and in a manner to be described. Finally, the entire pushbutton means 28, including the lens assembly 28 and lamp base assembly 32, is removed outwardly and upwardly, as shown in FIGURE 10. The pushbutton means 28 may be completely removed from the casing 20 for any desired purpose, such as for removing and replacing any one or more of the lamps 172 which are supported by the lamp base assembly.

DESCRIPTION OF THE CASING 20

The casing 20 may be a tubular casing, which may be, if desired, rectangular or square in cross section, as shown in FIGURE 1, It may have four sides 46, 46 and 48, 48. These sides 46 and 48 may be secured to each other at the corners, in any suitable manner, and their lower ends may be secured to a connector supporting base 50, which may be made of electrically insulating material. Such sides may be secured to the base 50 by any suitable fasteners, such as screws 52 or the like. One or more electrical contact supporting rods 54 are upwardly biased by an electrical conductor metal coil spring 56. The rods 54 may be vertically slidable in the base 50, and may have upward limit flanges 58 at their lower ends, and may have illuminating lamp electrically energizing contacts 60 at their upper ends. Each rod 54 may have a perforated terminal connector clip 62, which extends vertically upward through the base 50 and has a horizontal spring supporting bent end plate 64, which is supported on the upper surface of the base 50. The spring 56 rests on the end plate 64, and engages and upwardly pushes the lamp contact 60 upwardly, in a manner to provide a stationary terminal connector 62 and a vertically movable contact 60, with efficient electrical conductivity.

The casing 20 also has means to support switch means 24 at the casing end 26. Any suitable means may be provided, such as a bracket 66, to support the switch means 24. The bracket 66 may be supported by a tube 68, which is secured to the bracket 66 and to the base 50 in any suitable manner. The tube 68 may have a shoulder construction 69 to engage the lower surface of the base 50, and may have an inward flange 70 against which a ring 72 is upwardly held by a compression spring 74, the lower end of which spring engages the shoulder 76 of an insulating sleeve 78. An inner metal tube 80 is supported by the sleeve 78 in any suitable manner to provide a guide way for the plunger 34 which may move downwardly through the tube 80, and engage the switch actuator 36.

The casing sides 48 may each have two inwardly biased flexible casing fingers 44 which may be formed from the same material as the sides 48, while forming the openings 82 in the sides 48. The fingers 44 are inwardly curled into the center part of the casing 20. Lamp assembly stops or supports 84 are provided to support and arrest the downward movement of the lamp base assembly 32.

The switch means 24 may be any suitable switch construction which may have an outwardly or upwardly biased plunger or rod 36, which places the switch construction inside switch means 24, not shown, in actuated condition, when the plunger 36 is in downward actuated condition, and places the switch in unactuated condition when the plunger 36 is outward. Any suitable number of electrical connectors 85 may be provided in the switch means 24, to connect the switch means 24 into any circuit which is to be controlled or varied by the operation of the switch 24. The switch 24 may be supported from the bracket 66 by any suitable switch supporting members 87, which may be of the sleeve and rivet variety, if desired.

The casing 20, as above described, may cooperate with the pushbutton means 28 in a manner to be more fully described.

THE PUSHBUTTON MEANS

The pushbutton means 28 may include the lens assembly 30, the lamp base assembly 32, and the switch actuating plunger 34. These members, 30, 32 and 34, may be secured together in any suitable manner, so that the lens assembly 30 many be pushed down by the finger of an operator, in a manner to cause relative movement with respect to the lamp base assembly 32 and also with respect to the casing 20, under certain operating conditions, in a manner to be described. If desired, the plunger 34 may be made to move in unison with the lens assembly 30 and this may be accomplished by providing a central actuator or actuator rod 86. The upper end of this rod 86 may be secured by any suitable manner to the lens assembly 30, and the lower end of the rod 86 may be secured in any suitable manner to the plunger 34.

Further details of the pushbutton means 28 become apparent from the following detailed descriptions of the lens assembly 30 and of the lamp base assembly 32.

THE LENS ASSEMBLY

The lens assembly 30 may be of any desired construction which provides supports for any one or more lenses 88 and 90 which may be fixedly secured to the actuator 86. The lens assembly 30 carries the opposite lens fingers 42 which are relatively rigid in construction. The lens 88 and/or lenses 90, the actuator 86, and the fingers 42 preferably are movable as a unit up and down lengthwise of the casing. The construction is preferably such that the upper surface 38 of the lens 88 may be pushed down by a finger of an operator or the like and released, to provide the movement and results herein described.

By way of example, the lens assembly may include a lens assembly casing 92, FIGURE 13, which has opposite pairs of sides 94, 94 and 96, 96. Such sides may be united at the corners by any suitable manner, as will become apparent.

The top lens 88 may have a top flange 100 and a main body 102, which is slightly smaller, laterally, than the flange 100. The main body 102 has a pair of opposite downward central lugs 104 (one of which lugs is not visible) and a pair of opposite lugs 106 (one of which pairs is not visible) which engage respectively the central recess 108 on each of the sides 96 and the outer recesses 110 in any suitable manner so that the top lens is securely held in the casing 92.

There may be one or more colored lenses 90 to be held underneath the top lens 88.

There may be from one to four colored lenses 90, such lens being differently colored if desired.

Any suitable means may be provided for supporting the lenses 90 underneath the top lens 88. For example, a cross member 112 may be secured or welded in end recesses 114 in the lens casing walls 94. Two additional cross members 116 may be welded to the member 112 and to the sides 96 of the lens casing to provide suitable dividers and receiving members for the lenses 90. The extensions 118 of the lenses 90 may rest in the recesses 114, and suitable lugs or bars 120 may be welded in the sides 96, to receive and support the sides of the lenses 90 underneath the recesses 108.

The actuator rod 86, which carries the plunger 34, may be secured to or be integral with the cross member 112.

While a specific structure has been described for the lens assembly 30, it is to be understood that any type of construction for supporting one or more lenses and the actuator 86 may be provided, as desired.

If desired, a thin transparent plate 122 (shown in FIGURE 13) may be placed between the top lens 88, and the colored lenses 90, and this plate 122 may have a trademark or the like, which will be illuminated and visible when the lamps are illuminated.

THE LAMP BASE ASSEMBLY

The lamp base assembly 32 may include an upper lamp base plate 124 and a lower lamp base plate 126. See FIGURES 3, 4, 7, 7A, and 7B. These plates may be eventually secured together adhesively or by any other method. These two plates are so formed that they are generally flat, but may have respectively recessed surfaces 128 and 130 to form cavities 132 through which the laterally movable arms 134 pass. These arms are surrounded by compression springs 136 and have pins 138 so that the springs 136 can bias the arms 134 horizontally outward. The arms 134 are slidable in openings at the inner ends of the cavities 132 so that the arms 134 are inwardly movable by the casing fingers 44, as between the positions of FIGURES 3 and 4. The arms 134 are also outwardly movable by the springs 136 acting on the pins 138, when the casing fingers 44 are pushed radially outward by arms 134 as variously shown in FIGURES 3, 4, 8, 9 and 10.

The arms 134 have pockets 140 to receive the extensions or tongues 42A of the fingers 42.

The recesses 128 of the upper plate 124, FIGURE 7, are enlarged at 142 to receive the T-shaped ends 144 of the arms 134, so that such arms can properly reciprocate radially inward and outward as they are acted on by the casing rods 44, the cam means 146, etc., which are to be further described.

The lamp base plates 124 and 126 have a central opening 148 through which the central actuator 86 passes. Additionally, the two cams 146 are located in the opening 148, such cams 146 being reversed 180° with respect to each other about their vertical axis. These cams 146 have oppositely directed inward tongues 150, FIGURE 6, which are located along the opposite edges of the actuator 86. The cams 146 also have outward tongues 152 that pass under the lower lamp assembly plate 126 and prevent the cams 146 from moving relatively upward with respect to lamp base plates 124 and 126 in the opening 148 any higher than the position shown in FIGURES 3, 4, 8, and 10. The cams 146 also have outward tongues 154 that are engaged by the ring 156, so that the ring 156 can lift the cams 146 upwardly along with the plates 124 and 126 during the action that takes place between FIGURES 8, 9 and 10 as will become apparent. The ring 156 is biased upwardly by a spring 158, the lower end of which spring is connected to plunger 34 through flange 160.

The outward tongues 154 of the cams 146 also are engaged by the ring 156 in an off center manner with respect to the central tongues 152. This causes a turning action of the cams 146 about the central tongues 152 in response to the off center upward thrust of the ring 156 on the off center tongues 154. This, in turn, causes an outward motion of the upper tongues 150 of the cams 146 whenever the arms 134 are not pushed inward against the cams 146 by the casing fingers 44, as in FIGURES 3 and 10.

The actuator 86 has an enlargement or wedge 155 which is located below the cam tongues 150 in FIGURES 3 and 4. When the lens assembly 30 is pulled upward from the position of FIGURE 4 to the position of FIGURE 8, the wedge 155 pries the tongues 150 apart slightly, with the cams 146 rocking outwardly about the tongues 152. The arms 134 are held against the wedges 146 by the casing fingers 44 during this time. The arms 134 and casing fingers move outwardly only a slight distance so that the casing fingers 44 still hold the lamp base plates 124 and 126 in their lowermost position against the stops 84. When the lens assembly has been completely pulled up to the position of FIGURE 8, the tongues 150 have been moved out slightly by the wedge 155 and have snapped back into a notch 164 that is formed on the actuator 86 between the lower end of wedge enlargement 155 and another lower enlargement 162 on the actuator 86.

The cams 146 have slanting outer edges 166 which have upper notches 168 and lower notches 170. The notches 168 receive the inner ends of the arms 134 in the position of FIGURE 9 and the notches 170 receive the inner ends of the arms 134 in the position of FIGURES 4 and 8.

When the actuator 86 is being pushed down from the position of FIGURE 8 to that of FIGURE 9, the downwardly moving slanting edges 166 of cams 146 cause the arms 134 and casing fingers 44 to move out of the lower notches 170 of FIGURE 8, outwardly along the slanting edges 166 and to snap back into upper notches 168 of FIGURE 9.

When the lamp assembly 30 is then released upwardly from the position of FIGURE 9 toward the position of FIGURE 10, the compression springs 56, 158 and 74 initially push up the cams 146, arms 134, lamp base plates 124 and 126, actuator 82 and lens assembly fingers 42. This moves the lens assembly 30 sufficiently out of the casing 20 so that the entire push button means 28 can be lifted out of the casing, to and beyond the position of FIGURE 10.

A final reaction between the compression spring 158, off center tongues 154, central tongues 152 causes tongues 150 to spread out of the actuator notch 164, FIGURE 9, and spring 158 causes cams 146 to snap up past the wedge 155, FIGURE 10. This permits the push button means 28 to be reinserted in the casing 20 as in FIGURES 2 and 3.

MISCELLANEOUS DETAILS

The lamps 172 may be of the flange type having lower flanges 174 by which the lamps 172 can be pulled downwardly. The flanges 174 also have electrical contacts 176 which engage the contacts 60 on the supporting rods 54.

The lower end of the actuator 86, FIGURE 2, has an enlargement 178 and barbs 180. The enlargement 178 engages an inner sleeve 182 in the plunger 34, to limit the inward travel of the actuator 86 into the plunger. The barbs 180 lock the actuator 86 in the plunger 34. The spring 158 enters the flange 160 of the plunger 34, and terminates at the bottom 185 of the opening in the plunger 34.

THE INSERTION OF PUSHBUTTON MEANS INTO THE CASING

As the pushbutton means 28 is inserted into the casing 20, FIGURES 1–4, the plunger 34 enters the tube 80, the lamp base 32 assembly enters the casing 20 with the plates 124 and 126 pushing the casing arms or fingers 44 outwardly, FIGURE 3, until the lower plate 126 engages the stops 84. The lower ends of the casing fingers 44 press in on the outer ends of the arms 134 which are stopped by the lower tongue ends 42A of lens fingers 42 in the pockets 140 of the arms 134. Stops 84 stop the downward movement of the lens assembly 30 and the lamp base assembly 32, as shown in FIGURE 3. When the operator releases the lens assembly 30, such lens assembly 30 rises by spring action of spring 74 to the position of FIGURE 4, which pulls the lower ends 42A of the lens fingers 42 upwardly above the outer ends 144 of the arms 134. This allows the casing fingers 44 to move inward over the ledges 184 of the lower plate 126 and push in the ends 144 of arms 134. This locks the lamp base assembly in the casing 20 and against the stops 84. Thereafter, the pushbutton may be operated by pushing down on the upper surface 38 of the lens assembly 30. This permits the fingers 42, FIGURE 4, to slide past the outer ends of the arms 134, as shown in dotted lines in FIGURE 4, while the lens assembly pushes the actuator 86 downwardly, so that it pushes the plunger 34 to move its lower end 40 to the dotted line position 40A, to actuate the switch means actuator 36 and actuate the switch means 24.

Therefore, the pushbutton means 28 may be pushed in and released repeatedly between the full and dotted positions of FIGURE 4 to actuate and unactuate the switch means 24 as often as desired.

REMOVING PUSHBUTTON FROM THE CASING

The pulling up of the lens assembly 30, to the position of FIGURE 8, from the position of FIGURE 4 causes the enlargement 155 of the actuator 86 to act on the tongues 150 and move the cams 146 radially outwardly enough to allow the enlargement 155 to move up past the tongues 150, as the wedge of 155 overcomes the resistance of the arms 134 and the housing fingers 44. As the lens assembly 30 moves upwardly from the position of FIGURE 4 the tongues 150 will be pushed into the slots 164 of the actuator 82. The cams 146 cannot move upwardly with respect to the lamp base plates 124 and 126 because of the inward tongues 152. The lens assembly 30 is then stopped from any further upward movement, since the casing fingers 44 are engaging the ledges 184 of the lower plate 126 and prevent the plates 124 and 126 from being pulled upwardly. This locks the entire pushbutton means 28 from further upward movement beyond that of FIGURE 8. Thereafter, the lens assembly 30 must be pushed downwardly to the position of FIGURE 9. As the lens assembly 30 is pushed downwardly from the position of FIGURE 8 to that of FIGURE 9, the cams 146 will also move downwardly, since they are pushed down by the enlargement 155 of the actuator 86 acting on the tongues 150 of the cams 146. This downward movement of the cams 146 with respect to the plates 124 and 126 causes the slanting surfaces 166 to move the arms 134 outwardly to push the casing fingers 44 out beyond the ledges 184 of the lower plate 126 so that the lower plate 126 can move upwardly out of the casing 20 from the position of FIGURE 9, when the lens assembly 30 is pushed upwardly by springs 56 and 74 after being released by the operator. At the same time the notches 168 of the cams 146 engage and lock against the inner ends of the arms 134 so that the cams 146 are temporarily locked against upward relative movement with respect to the arms 134 and the lamp base plates 124 and 126. The downward movement of the lens assembly 30 is stopped at the position of FIGURE 9, since the lens assembly fingers 42 have had their end tongues 42A inserted in the pockets 140 of the arms 134. Since downward movement of the lens fingers 42 are stopped at the position of FIGURE 9, and the operator then will release the lens assembly 30 upward from the position of FIGURE 9 and pull the lens assembly to and beyond that of FIGURE 10. The lens assembly 30, and the entire pushbutton means 28 may be pulled up out of the casing 20, since the locking fingers 44 of the casing 20 have been pushed out beyond the ledge 184 of the lower plate 126, so that the entire lamp base assembly 32 can be pulled out of the casing 20 to and beyond the outward movement position of FIGURE 10. The lamps 172 can be withdrawn and replaced, if desired, and any other repairs or adjustments may be made to the members of the pushbutton means 28.

As the lamp base assembly 32 is withdrawn from the position of FIGURE 9, the casing fingers 44 will no longer be pressing in the arms 134 and the cams 146. The springs 136 now force the arms 134 outwardly, as shown in FIGURE 10. The spring 158, ring 156 and tongues 154 can now force the cams 146 upward, with respect to the lamp base plates 124 and 126, as shown in FIGURE 10.

After adjustments have been made in the withdrawn pushbutton means 28, if necessary, or in the casing 20, the pushbutton means 28 may be reinserted into the casing 20 from the positions of FIGURES 1 and 2 to the positions of FIGURES 3 and 4, as desired.

A neutral connection for the lamps 172 is shown in FIGURES 11 and 14, which is applicable to all of the figures. However, other neutral connections may be used, if desired.

A neutral connection metal plate 186 may be countersunk in the lower lamp base plate 126, which plate may surround the opening 148 and may have branches 188 extending into the lamp openings 190 in the lamp base plates 124 and 126. The branches 188 have resilient upward neutral tongue contacts 192 which engage the usual neutral cylindrical metal sleeves 194 of the lamps 172.

One or more upwardly spring biased neutral contacts 196 may be supported on the supporting base 50 of the casing. These contacts 196 may have an upward pin or contact to engage the neutral plate 186 to provide illuminating circuits for the lamps 172 in combination with the live flange contacts 176. These neutral contacts 196 may be generally the same in construction and action as the live contacts 60. The neutral contacts 196 have not been illustrated in the other figures since their addition in such other figures would have an overcrowding effect.

To summarize, a combination has been provided which has a casing 20 with a receiving aperture means or opening 24. Switch means 24 are connected with the casing. A pushbutton construction means 28 is provided to actuate and unactuate such switch means 24. Such pushbutton construction means 28 is movable inward relatively to the casing aperture means 22 by a pushing in action.

Locking and withdrawing means are provided, including parts heretofore described, to lock the pushbutton construction means 28 in switch means actuating and unactuating operable locked condition, as in FIGURE 4, by an initial locking pushing in action of said pushbutton construction means 28 into the aperture means 22 as shown in FIGURE 3, followed by the released action shown in FIGURE 4.

Also the pushbutton construction means 28 may be withdrawn from such operable locked condition of FIGURE 4, by an initial pulling out action of said pushbutton construction means 28, as shown in FIGURE 8, followed by a releasing pushing in action of such pushbutton construction means 28, as shown in FIGURE 9.

The pushbutton construction means is inwardly actuatable and outwardly releasable between the full line position to the dotted line position of FIGURE 4 to operate the switch means 24 respectively to switch means actuated condition, as shown in dotted lines 36A in FIGURE 4, and to unactuated switch means condition, as shown in full lines in FIGURE 4, while said pushbutton construction means is in the locked operable condition of FIGURE 4.

Safety means are provided, including the insertion of the pushbutton finger tongues 42A into the pockets of arms 134, FIGURE 3, to prevent the pushbutton construction means 28 from operating the switch means 24 to actuated condition during the initial locking pushing in action of FIGURE 3.

The pushbutton construction means 28 includes the pushing member means 30 and the lamp holder means 32 relatively movably and unitarily secured together. Said lamp holder means 32 is locked to said casing 20 by an initial locking pushing in action of said pushing member means 30 as in FIGURE 3 followed by a release of said pushing member means 30 to the position of FIGURE 4.

Said pushing member means 30 is pushable in and releasable out respectively to actuate and to unactuate said switch means 24 while said lamp holder means 32 is locked to said casing 20.

Said safety means may include the fingers 42 of the pushing member means 30 engaging the pockets 140 of the arms 134 and preventing said pushing member means 30 from actuating said switch means 24 to actuated condition during said initial pushing in action, as in FIGURE 3, of said pushing member means 30.

A new, unobvious and useful pushbutton means with pull out, push in release has thus been provided.

What is claimed is:

1. In combination:
   a casing having a receiving casing aperture means;
   switch means connected with said casing;
   pushbutton construction means disposed in said aperture means and having actuating means operatively associated with said swtich means to actuate and unactuate said switch means when said pushbutton construction means is in a locked condition in said aperture means and being movable inward relatively to said aperture means by a pushing in action;
   locking and withdrawing means carried by said casing and said pushbutton construction means locking said pushbutton construction means in said switch means actuating and unactuating operable locked condition by an initial locking pushing in action of said pushbutton construction means into said aperture means followed by a release of said pushbutton construction means, and to withdraw said pushbutton construction means from said operable locked condition by an initial pulling out action of said pushbutton construction means followed by a releasing pushing in action of said pushbutton construction means, said pushbutton construction means being inwardly actuatable and outwardly releasable to operate said switch means by said actuating means respectively to actuated switch means condition and to unactuated switch means condition while said pushbutton construction means is in said locked operable condition;
   and safety means carried by said pushbutton construction means and being operatively associated with said actuating means thereof, said safety means preventing said actuating means of said pushbutton construction means from operating said switch means to actuated condition during said initial locking pushing in action.

2. A combination according to claim 1 in which said pushbutton construction means includes a pushing in member means that defines said actuating means thereof and a lamp holder means relatively movably and unitarily secured together, and in which said lamp holder means is locked to said casing by an initial locking pushing in action of said pushing in member means followed by a release of said pushing in member means, and said pushing in member means is pushable in and releasable out respectively to actuate and to unactuate said switch means while said lamp holder means is locked to said casing, and said safety means prevents said pushing in member means from actuating said switch means to actuated condition during said initial pushing in action of said pushing in member means.

3. A combination according to claim 2 in which said lamp holder means is unlocked from said casing by a pulling out action of said pushing in member means followed by a releasing pushing in action of said pushing in member means.

4. A combination according to claim 3 in which said pushing in member means is a lens assembly means.

5. In combination:
   a tubular casing having a receiving casing aperture means adjacent one end and a plunger guiding means adjacent the other end;
   a switch means actuating plunger adapted to reciprocate in said plunger guiding means;
   a switch means connected to said casing adjacent said other end and being actuable by reciprocation of said plunger to switch means actuated condition and an unactuated condition when said plunger is in said plunger guiding means;
   a pushing member means and a lamp holder means relatively movably unitarily secured together as a pushbutton construction means and being insertable in and removable from said casing through said casing aperture means, said pushbutton construction means being disposed in said casing aperture means and carrying said plunger;
   locking means carried by said casing and said pushbutton construction means locking said lamp holder means in locked condition in said casing by an initial pushing in action of said pushing member means, followed by a releasing action of said pushing member mean;
   locking release means carried by said casing and said pushbutton construction means releasing said lamp holder means from said locked condition by a pulling out action on said pushing member means followed by a releasing pushing in action of said pushing member means;
   plunger reciprocating means connected to said pushing member means and to said plunger to reciprocate said plunger to switch means actuated condition by inward pushing in action on said pushing member means and to reciprocate said plunger to switch means unactuated condition by release of said pushing member means while said lamp holder means is in locked condition;
   and safety means carried by said pushbutton construction means and being operatively associated with said plunger reciprocating means, said safety means preventing said plunger reciprocating means from reciprocating said plunger to switch means actuated condition during said initial pushing in action of said pushing member means.

6. A combination according to claim 5, in which said pushing member means includes a lens assembly having two downward relatively rigid lens assembly fingers defining part of said locking release means, said casing includes two inwardly resiliently biased flexible casing fingers defining part of said locking means, and said lamp holder means includes a lamp base assembly having two outwardly spring biased arms defining part of said safety means, said lens assembly fingers, aid casing fingers and said arms having a cooperation to cause said locking means, said lens assembly fingers, said casing fingers and said arms having a cooperation to cause said locking means to lock said lamp holder means in locked condition, to cause said locking release means to release said lamp holder means from said locked condition, and to cause said safety means to prevent said plunger from reciprocating said switch means to switch means actuated condition during said initial pushing in action.

7. A combination according to claim 6, in which cam means in a central opening in said lamp holder means defines part of said safety means and cooperates with said arms to lock said lamp holder means in said casing and to release said lamp holder means from said casing.

8. In combination:
   a tubular casing having a receiving casing aperture means adjacent one end and a plunger guiding means adjacent the other end;
   a switch means actuating plunger adapted to reciprocate in said plunger guiding means;
   a switch means connected to said casing adjacent said other end and being actuatable by reciprocation of said plunger to switch means actuated condition and an unactuated condition when said plunger is in said plunger guiding means;

a pushing member means and a lamp holder means relatively movably unitarily secured together as a pushbutton construction means and being insertable in and removable from said casing through said casing aperture means, said pushbutton construction means being disposed in said casing aperture means and carrying said plunger;

locking means carried by said casing and said pushbutton construction means locking said lamp holder means in locked condition in said casing by an initial pushing in action of said pushing member means, followed by a releasing action of said pushing member means;

locking release means carried by said casing and said pushbutton construction means releasing said lamp holder means from said locked condition by a pulling out action on said pushing member means followed by a releasing pushing in action of said pushing member means;

plunger reciprocating means connected to said pushing member means and to said plunger to reciprocate said plunger to switch means actuated condition by inward pushing in action on said pushing member means and to reciprocate said plunger to switch means unactuated condition by release of said pushing member means while said lamp holder means is in locked condition;

safety means carried by said pushbutton construction means and being operatively associated with said plunger reciprocating means, said safety means preventing said plunger reciprocating means from reciprocating said plunger to switch means actuated condition during said initial pushing in action of said pushing member means;

said pushing member means including a lens assembly having two downward relatively rigid lens assembly fingers defining part of said locking release means, said casing including two inwardly resiliently biased flexible casing fingers defining part of said locking means and said lamp holder means including a lamp base assembly having two outwardly spring biased arms defining part of said safety means, said lens assembly fingers, said casing fingers and said arms having a cooperation to cause said locking means to lock said lamp holder means in locked condition, to cause said locking release means to release said lamp holder means from said locked condition, and to cause said safety means to prevent said plunger from reciprocating said switch means to switch means actuated condition during said initial pushing in action;

and cam means in a central opening in said lamp holder means defines part of said safety means and cooperating with said arms to lock said lamp holder means in said casing and to release said lamp holder means from said casing, said cam means including two similar cams reversed 180° with respect to each other about their vertical axis.

9. A combination according to claim 8 in which a central actuator rod is connected to said lens assembly and to said plunger and defines said plunger reciprocating means, passes through said central opening and cooperates with said cams to cause said lens assembly fingers, said casing fingers and said arms to have said cooperation.

10. A combination according to claim 9 in which a cam operating ring surrounds said actuator rod and a compression spring surrounds said actuator rod between said ring and plunger to operate said cams to cause said cooperation.

11. A combination according to claim 10 in which another compression spring surrounds said plunger and upwardly biases said plunger to cause said cooperation.

12. In combination:
a casing having a receiving casing aperture means;
a switch means connected to said casing;
a pushing member means and a lamp holder means relatively movably unitarily secured together as a pushbutton construction means and being insertable in and removale from said casing through said casing aperture means, said switch means being actuatable to actuated condition and unactuated condition by pushing in action and release action on said pushing member means when said pushbutton construction means is in a locked condition in said casing aperture means, said pushbutton construction means having actuating means operatively associated with said switch means for operating the same and being disposed in said casing aperture means;

locking means carried by said casing and said pushbutton construction means locking said lamp holder means in said locked condition in said casing by an initial pushing in action of said pushing member means, followed by a releasing action of said pushing member means;

locking release means carried by said casing and said pushbutton construction means releasing said lamp holder means from said locked condition by a pulling out action on said pushing member means followed by a releasing pushing in action of said pushing member means;

and safety means carried by said pushbutton construction means and being operatively associated with said actuating means, said safety means preventing said actuating means of said pushing member means from actuating said switch means to switch means actuated condition during said initial pushing in action of said pushing member means.

13. A combination according to claim 12, in which said pushing member means includes a lens assembly having downward relatively rigid lens assembly finger means defining part of said locking release means, said casing includes inwardly resiliently biased flexible casing finger means defining part of said locking means, and said lamp holder means includes a lamp base assembly having outwardly spring biased arm means defining part of said safety means, said lens assembly finger means, said casing finger means and said arm means having a cooperation to cause said locking means to lock said lamp holder means in locked condition, to cause said locking release means to release said lamp holder means from said locked condition, and to cause said safety means to prevent said pushing member means from actuating said switch means to switch means actuated condition during said initial pushing in action.

14. A combination according to claim 13, in which cam means in a central opening in said lamp holder means defines part of said safety means and cooperates with said arm means to lock said lamp holder means from said casing and to release said lamp holder means from said casing.

15. In combination:
a casing having a receiving casing aperture means;
a switch means connected to said casing;
a pushing member means and a lamp holder means relatively movably unitarily secured together as a pushbutton construction means and being insertable in and removable from said casing through said casing aperture means, said switch means being actutable to actuated condition and unactuated condition by pushing in action and release action on said pushing member means when said pushbutton construction means is in a locked condition in said casing aperture means, said pushbutton construction means having actuating means operatively associated with said switch means for operating the same and being disposed in said casing aperture means;

locking means carried by said casing and said push button construction means locking said lamp holder means in said locked condition in said casing by an initial pushing in action of said pushing member means, followed by a releasing action of said pushing member means;

locking release means carried by said casing and said pushbutton construction means releasing said lamp holder means from said locked condition by a pulling out action on said pushing member means followed by a releasing pushing in action of said pushing member means;

and safety means carried by said pushbutton construction means and being operatively associated with said actuating means, said safety means preventing said actuating means of said pushing member means from actuating said switch means to switch means actuated condition during said initial pushing in action of said pushing member means;

said pushing member means including a lens assembly having downward relatively rigid lens assembly finger means defining part of said locking release means, said casing including inwardly resiliently biased flexible casing finger means defining part of said locking means and said lamp holder means includes a lamp base assembly having outwardly spring biased arm means defining part of said safety means, said lens assembly finger means, said casing finger means and said arm means having a cooperation to cause said locking means to lock said lamp holder means in locked condition to cause said locking release means to release said lamp holder means from said locked condition, and to cause said safety means to prevent said pushing member means from actuating said switch means to switch means actuated condition during said initial pushing in action; and cam means in a central opening in said lamp holder means defines part of said safety means and cooperating with said arm means to lock said lamp holder means from said casing and to release said lamp holder means from said casing, said cam means including two similar cams reversed 180° with respect to each other about their vertical axis.

16. A combination according to claim 15, having a switch actuating plunger defining said actuating means of said pushbutton construction means, and in which a central actuator rod is connected to said lens assembly and to said plunger, passes through said central opening and cooperates with said cam means to cause said lens assembly finger means, said casing finger means and said arm means to have said cooperation.

17. A combination according to claim 16 in which a cam operating ring surrounds said actuator rod and a compression spring surrounds said actuator rod between said ring and plunger to operate said cam means to cause said cooperation.

18. A combination according to claim 17 in which another compression spring surrounds said plunger and upwardly biases said plunger to cause said cooperation.

References Cited
UNITED STATES PATENTS

| | | | |
|---|---|---|---|
| 2,904,662 | 9/1959 | Spring | 200—159 |
| 3,090,949 | 5/1963 | Hallerberg | 200—159 |
| 3,197,598 | 7/1965 | Andersen et al. | |
| 3,249,705 | 5/1966 | Amis et al. | |
| 3,267,245 | 8/1966 | Vincent. | |
| 3,274,354 | 9/1966 | Stevens. | |
| 3,396,602 | 8/1968 | Di Pilla | 200—153 |

H. O. JONES, Primary Examiner

U.S. Cl. X.R.

200—153